United States Patent
Tabuchi et al.

(10) Patent No.: US 10,457,821 B2
(45) Date of Patent: Oct. 29, 2019

(54) AQUEOUS INKJET INK, INKJET RECORDING METHOD, AND INKJET RECORDING DEVICE

(71) Applicant: Roland DG Corporation, Hamamatsu-shi, Shizuoka (JP)

(72) Inventors: Shinji Tabuchi, Hamamatsu (JP); Aoi Tanaka, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 48 days.

(21) Appl. No.: 15/835,496

(22) Filed: Dec. 8, 2017

(65) Prior Publication Data
US 2018/0171165 A1 Jun. 21, 2018

(30) Foreign Application Priority Data

Dec. 20, 2016 (JP) .................. 2016-246413
Feb. 3, 2017 (JP) .................. 2017-018505
Jul. 3, 2017 (JP) .................. 2017-130380

(51) Int. Cl.
*B41J 11/00* (2006.01)
*C09D 11/102* (2014.01)
(Continued)

(52) U.S. Cl.
CPC ......... *C09D 11/033* (2013.01); *B41J 11/0015* (2013.01); *C09D 11/102* (2013.01); *C09D 11/107* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| | | | |
|---|---|---|---|
| 5,546,108 A * | 8/1996 | Hotomi | B41J 2/005 347/55 |
| 6,196,674 B1 * | 3/2001 | Takemoto | B41J 2/0057 347/103 |

(Continued)

FOREIGN PATENT DOCUMENTS

JP 2015-193788 A 11/2015

OTHER PUBLICATIONS

Material Safety Data Sheet Dipropylene Glycol Methyl Ethers (MSDS); Finar Limited (Nov. 26, 2012) pp. 1-6. (Year: 2012).*

*Primary Examiner* — Manish S Shah
(74) *Attorney, Agent, or Firm* — Keating & Bennett, LLP

(57) ABSTRACT

An aqueous inkjet ink includes at least water, a coloring material, a water-soluble organic solvent component, a surfactant, and resin microparticles. The water-soluble organic solvent component includes a first monool-type solvent represented by $R^1O(CH_2CH_2O)_mH$ in which $R^1$ represents a straight or branched alkyl group having 1 to 4 carbon atoms, and m represents an integer of 2 or 3, a second monool-type solvent represented by $R^2O(C_3H_6O)_nH$ where $R^2$ represents a straight or branched alkyl group having 1 to 4 carbon atoms, and n represents an integer of 2 or 3, and a third monool-type solvent that is at least one selected from the group consisting of 3-methoxy-1-butanol and 3-methoxy-3-methyl-1-butanol. The content of the third monool-type solvent in the ink is about 8% by mass or greater and about 27% by mass or less. The content of the first monool-type solvent in the ink is about 0.5% by mass or greater and about 9% by mass or less. The content of the second monool-type solvent in the ink is about 0.5% by mass or greater and about 9% by mass or less. The content of the water-soluble organic solvent component in the ink is about 15% by mass or greater and about 42% by mass or less.

12 Claims, 1 Drawing Sheet

(51) Int. Cl.
*C09D 11/033* (2014.01)
*C09D 11/322* (2014.01)
*C09D 11/107* (2014.01)

(58) Field of Classification Search
CPC ...... B41J 2/1755; B41J 2/2114; B41J 2/2117;
B41J 2/2056; B41J 2/21; B41J 2/0057;
B41J 3/60; B41J 2002/012; B41J
2/04598; B41J 2/04588; B41J 2/04595;
B41J 2/04586; B41J 2/14274; B41J
11/0015; B41J 11/002; B41J 2/161; B41J
2/1623; B41J 2202/00; B41J 2202/03;
B41J 2/14201; B41J 2/045; C09D 11/36;
C09D 11/40; C09D 11/30; C09D 11/38;
C09D 11/32; C09D 11/322; C09D
11/324; C09D 11/328; C09D 11/101;
C09D 11/102; C09D 11/005; C09D
11/54; C09D 11/52; B41M 5/0011; B41M
5/0017; B41M 5/0047; B41M 7/00;
B41M 7/0072; B41M 5/52; B41M 5/5218
See application file for complete search history.

(56) References Cited

U.S. PATENT DOCUMENTS

| | | | | |
|---|---|---|---|---|
| 6,419,733 | B1* | 7/2002 | Sano | C09D 11/322 106/31.72 |
| 6,530,708 | B2* | 3/2003 | Ichikawa | B43K 7/08 401/141 |
| 2002/0008747 | A1* | 1/2002 | Kaga | B41M 5/52 347/102 |
| 2002/0077384 | A1* | 6/2002 | Sano | C09D 11/32 523/160 |
| 2004/0114013 | A1* | 6/2004 | Doi | C09D 11/322 347/100 |
| 2005/0081745 | A1* | 4/2005 | Ogawa | C09D 11/30 347/100 |
| 2009/0068417 | A1* | 3/2009 | Saito | C09D 11/322 428/195.1 |
| 2015/0275014 | A1* | 10/2015 | Yamazaki | C09D 11/38 347/20 |
| 2017/0029638 | A1* | 2/2017 | Fujii | B41J 2/17503 |

* cited by examiner

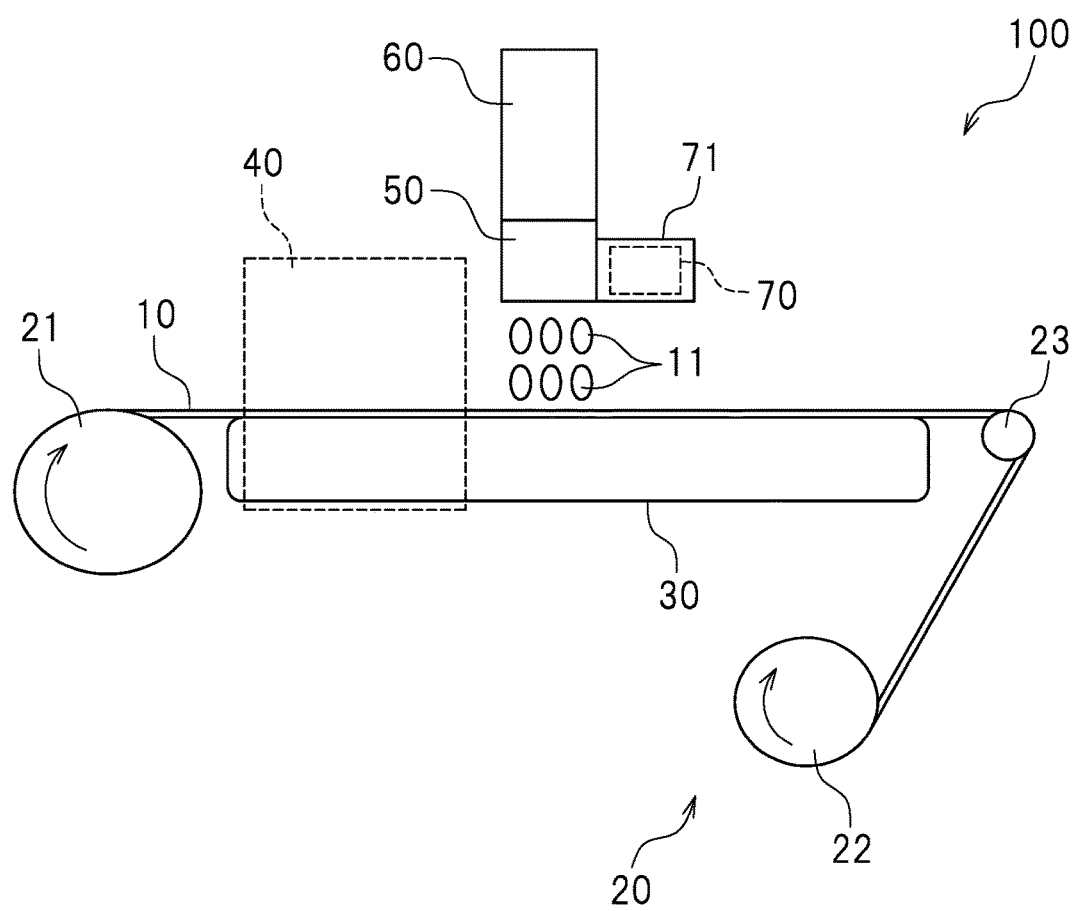

AQUEOUS INKJET INK, INKJET RECORDING METHOD, AND INKJET RECORDING DEVICE

CROSS REFERENCE TO RELATED APPLICATIONS

This application claims the benefit of priority to Japanese Patent Application No. 2016-246413 filed on Dec. 20, 2016, Japanese Patent Application No. 2017-018505 filed on Feb. 3, 2017, and Japanese Patent Application No. 2017-130380 filed on Jul. 3, 2017. The entire contents of each application are hereby incorporated herein by reference.

BACKGROUND OF THE INVENTION

1. Field of the Invention

The present invention relates to aqueous inkjet inks, and to inkjet recording methods and inkjet recording devices.

2. Description of the Related Art

An inkjet printer using an inkjet recording system has the advantages of, for example, being easy to operate, generating little noise, and allowing color printing to be performed easily, and thus is in wide use as a home-use or office-use output device. Recently, an inkjet printer is also applied to industrial uses for, for example, displays, posters, signboards and the like.

The inkjet recording system is a recording system that directly ejects an ink liquid drop toward a medium from a very small nozzle and causes the ink liquid drop to adhere to the medium, thus providing a letter or an image. For industrial uses, a non-absorbent substrate is often used as a medium. One representative non-absorbent substrate is a poly(vinyl chloride) (PVC) substrate.

For printing (for forming an image) on a PVC substrate, an eco-solvent-based inkjet ink containing a glycolether-based solvent and a resin-soluble solvent (e.g., lactone, etc.) is suitable. The eco-solvent-based inkjet ink dissolves a surface of the PVC substrate and coats the surface of the PVC substrate with a pigment and a fixing resin to form an image. Therefore, the eco-solvent-based inkjet ink provides a high image quality with, for example, little or no ink bleeding, and has a high fixation.

However, there is a concern that the volatilized solvent of the eco-solvent-based inkjet ink may adversely influence the environment and the human body. Therefore, aqueous inkjet inks suitable for printing on a PVC substrate are desired and are now being progressively developed. Such aqueous inkjet inks typically include water, a water-soluble organic solvent, a coloring material, and resin microparticles as a fixing component (see, for example, Japanese Laid-Open Patent Publication No. 2015-193788).

The above-described aqueous inkjet ink including the resin microparticles forms a clear image on offset coated paper or the like, but does not easily form a clear image on a PVC substrate. Namely, when being used to form an image on the PVC substrate, the aqueous inkjet ink has a problem of easily causing ink bleeding from the image. There is another problem that when the aqueous inkjet ink is used to form an image of, especially, a low resolution, the resultant image has a low optical concentration value. In addition, the aqueous inkjet ink does not dissolve the PVC substrate unlike the eco-solvent-based inkjet ink, and therefore has a problem of not providing a high level of fixation of the image. The above-described aqueous inkjet ink is required to have a superb storage stability.

SUMMARY OF THE INVENTION

Preferred embodiments of the present invention provide aqueous inkjet inks that have a superb storage stability and, when used to print on a PVC substrate, form an image with little or no ink bleeding, a high optical concentration value, and a high level of fixation.

An aqueous inkjet ink according to a preferred embodiment of the present invention includes at least water (A); a coloring material (B); a water-soluble organic solvent component (C); a surfactant (D); and resin microparticles (E). The water-soluble organic solvent component (C) includes a first monool-type solvent represented by $R^1O(CH_2CH_2O)_mH$ in which $R^1$ represents a straight or branched alkyl group having 1 to 4 carbon atoms, and m represents an integer of 2 or 3; a second monool-type solvent represented by $R^2O(C_3H_6O)_nH$ in which $R^2$ represents a straight or branched alkyl group having 1 to 4 carbon atoms, and n represents an integer of 2 or 3; and a third monool-type solvent that is at least one selected from the group consisting of 3-methoxy-1-butanol and 3-methoxy-3-methyl-1-butanol. The content of the third monool-type solvent in the ink is about 8% by mass or greater and about 27% by mass or less. The content of the first monool-type solvent in the ink is about 0.5% by mass or greater and about 9% by mass or less. The content of the second monool-type solvent in the ink is about 0.5% by mass or greater and about 9% by mass or less. The content of the water-soluble organic solvent component (C) in the ink is about 15% by mass or greater and about 42% by mass or less.

An inkjet recording method according to a preferred embodiment of the present invention includes ejecting an aqueous inkjet ink according to the above-described preferred embodiment of the present invention toward a medium including a non-absorbent substrate; and drying the aqueous inkjet ink ejected on the medium to form an ink film.

An inkjet recording device according to a preferred embodiment of the present invention includes a conveyer that transports a medium including a non-absorbent substrate; a heater that heats the transported medium; an ejector that ejects an inkjet ink toward the heated medium; and an ink container that contains the inkjet ink and supplies the inkjet ink to the ejector. The inkjet ink is an aqueous inkjet ink according to the above-described preferred embodiment of the present invention.

Preferred embodiments according to the present invention provide aqueous inkjet inks that have a superb storage stability and, when used to print on a PVC substrate, form an image with little or no ink bleeding, a high optical concentration value, and a high level of fixation.

The above and other elements, features, steps, characteristics and advantages of the present invention will become more apparent from the following detailed description of the preferred embodiments with reference to the attached drawings.

BRIEF DESCRIPTION OF THE DRAWINGS

The FIGURE is a conceptual view of an inkjet recording device according to a preferred embodiment of the present invention.

DETAILED DESCRIPTION OF THE PREFERRED EMBODIMENTS

An aqueous inkjet ink according to a preferred embodiment of the present invention includes at least water (A); a coloring material (B); a water-soluble organic solvent component (C); a surfactant (D); and resin microparticles (E). The water-soluble organic solvent component (C) includes a first monool-type solvent represented by $R^1O(CH_2CH_2O)_mH$ (in the formula, $R^1$ represents a straight or branched alkyl group having 1 to 4 carbon atoms, and m represents an integer of 2 or 3) (hereinafter, referred to also as a "monool-type solvent (1)"); a second monool-type solvent represented by $R^2O(C_3H_6O)_nH$ (in the formula, $R^2$ represents a straight or branched alkyl group having 1 to 4 carbon atoms, and n represents an integer of 2 or 3) (hereinafter, referred to also as a "monool-type solvent (2)"); and a third monool-type solvent that is at least one selected from the group consisting of 3-methoxy-1-butanol and 3-methoxy-3-methyl-1-butanol (hereinafter, referred to also as a "monool-type solvent (3)"). The content of the monool-type solvent (3) in the ink is about 8% by mass or greater and about 27% by mass or less. The content of the monool-type solvent (1) in the ink is about 0.5% by mass or greater and about 9% by mass or less. The content of the monool-type solvent (2) in the ink is about 0.5% by mass or greater and about 9% by mass or less. The content of the water-soluble organic solvent component (C) in the ink is about 15% by mass or greater and about 42% by mass or less.

Water (A)

An aqueous inkjet ink according to a preferred embodiment of the present invention includes water (A). Due to the presence of water (A), the aqueous inkjet ink has an advantage of having a small environmental load. There is no specific limitation on the type of water (A) used in the inkjet ink. From the point of view of preventing incorporation of impurities, ion exchange water, ultrafiltration water, reverse osmosis water, distilled water, and ultrapure water are preferable. Ion exchange water is more preferable.

The content of the water (A) in an aqueous inkjet ink according to a preferred embodiment of the present invention is, for example, preferably about 40% by mass or greater, more preferably about 45% by mass or greater, and still more preferably about 50% by mass or greater. The content of the water (A) in the inkjet ink according to a preferred embodiment of the present invention is, for example, preferably about 80% by mass or less, more preferably about 75% by mass or less, and still more preferably about 70% by mass or less.

Coloring Material (B)

As the coloring material (B), for example, a dye, a pigment or the like is usable. A single type of coloring material may be used, or two or more types of coloring materials may be combined at any ratio.

As the dye, any of various dyes known to be usable for an aqueous inkjet ink is usable. Examples of such usable dyes include a direct dye, an acid dye, a food dye, a basic dye, a reactive dye, a dispersion dye, a vat color dye, and the like.

The dye will be described in more detail. Examples of cyan dyes include C. I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C. I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C. I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; C. I. Food Blue 1 and 2; C. I. Basic Blue 9, 25, 28, 29, and 44; and the like.

Examples of magenta dyes include C. I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C. I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C. I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; C. I. Food Red 7, 9, and 14; and the like.

Examples of yellow dyes include C. I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C. I. Direct Yellow 1, 8, 11, 12, 24, 26, 27, 33, 39, 44, 50, 58, 85, 86, 87, 88, 89, 98, 110, 132, 142, and 144; Reactive Yellow 1, 2, 3, 4, 6, 7, 11, 12, 13, 14, 15, 16, 17, 18, 22, 23, 24, 25, 26, 27, 37, and 42; C. I. Food Yellow 3 and 4; and the like.

Examples of black dyes include C. I. Direct Black 1, 7, 19, 32, 51, 71, 108, 146, 154, and 166; and the like.

Examples of dyes other than the cyan, magenta, yellow and black dyes include C. I. Acid Green 7, 12, 25, 27, 35, 36, 40, 43, 44, 65, and 79; C. I. Direct Green 1, 6, 8, 26, 28, 30, 31, 37, 59, 63, and 64; C. I. Reactive Green 6 and 7; C. I. Direct Violet 2, 48, 63, and 90; C. I. Reactive Violet 1, 5, 9, and 10; and the like.

As the pigment, either an inorganic pigment or an organic pigment may be used.

Examples of organic pigments include an azo pigment (e.g., an azo lake pigment, an insoluble azo pigment, a condensed azo pigment, a chelating azo pigment, etc.); a polycyclic pigment (e.g., a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinofuranone pigment, etc.), a dye chelate (e.g., a basic dye-based chelate, an acid dye-based chelate, etc.), a nitro pigment, a nitroso pigment, an aniline black pigment, and the like.

Examples of inorganic pigments include titanium oxide, zinc oxide, zinc sulfide, white lead, calcium carbonate, settleable barium sulfate, white carbon, alumina white, kaolin clay, talc, bentonite, black iron oxide, cadmium red, red iron oxide, molybdenum red, molybdate orange, chrome vermillion, chrome yellow, cadmium yellow, yellow iron oxide, titanium yellow, chromium oxide, viridian, titanium cobalt green, cobalt green, cobalt chrome green, victoria green, ultramarine, Prussian blue, cobalt blue, cerulean blue, cobalt silica blue, cobalt zinc silica blue, manganese violet, cobalt violet, and the like.

More specifically, examples of black-type pigments include carbon black pigments (C. I. pigment black 7) such as furnace black, lamp black, acetylene black, channel black and the like; metal pigments such as copper, iron (C. I. pigment black II), and the like; metal oxide pigments such as titanium oxide and the like; organic pigments such as aniline black (C. I. pigment black 1); and the like.

Examples of cyan-type pigments include C. I. pigment blue 1, 2, 3, 15:1, 15:3, 15:4, 15:6, 16, 21, 22, 60, and 64; and the like.

Examples of magenta-type pigments include C. I. pigment red 5, 7, 9, 12, 31, 48, 49, 52, 53, 57, 97, 112, 120, 122, 146, 147, 149, 150, 168, 170, 177, 178, 179, 184, 188, 202, 206, 207, 209, 238, 242, 254, 255, 264, 269, and 282; C. I. pigment violet 19, 23, 29, 30, 32, 36, 37, 38, 40, and 50; and the like.

Examples of yellow-type pigments include C. I. pigment yellow 1, 2, 3, 12, 13, 14, 16, 17, 20, 24, 74, 83, 86, 93, 94, 95, 109, 110, 117, 120, 125, 128, 129, 137, 138, 139, 147, 148, 150, 151, 154, 155, 166, 168, 180, 185, and 213; and the like.

Examples of other pigments include C. I. pigment green 7, 10, and 36; C. I. pigment brown 3, 5, 25, and 26; C. I. pigment orange 2, 5, 7, 13, 14, 15, 16, 24, 34, 36, 38, 40, 43, 62, 63, 64, and 71; and the like.

Among such pigments, black-type pigments, especially, carbon black pigments, are preferable because such pigments provide an especially high effect of a preferred embodiment of the present invention, namely, the effect of forming an image having a high optical concentration value.

In addition, a pigment including a hydrophilic group such as a carboxyl group, a sulfonic acid group, a phosphonic acid group, a hydroxyl group or the like at a surface thereof (so-called "self-dispersing pigment") may be used. Examples of carbon black-type self-dispersing pigments include CAB-O-JET 200, 300, 352K, and 400 (produced by Cabot Corporation); and the like. Examples of cyan-type self-dispersing pigments include CAB-O-JET 250C, 450C, and 554B (produced by Cabot Corporation); and the like. Examples of magenta-type self-dispersing pigments include CAB-O-JET 260M, 265M, and 465M (produced by Cabot Corporation); and the like. Examples of yellow-type self-dispersing pigments include CAB-O-JET 270Y, 470Y, and 740Y (produced by Cabot Corporation); and the like. As the coloring material (B), a self-dispersing pigment, which is dispersible in the water (A) without the use of a dispersant, is preferable.

The content of the coloring material (B) in an aqueous inkjet ink according to a preferred embodiment of the present invention is, for example, preferably about 0.1% by mass or greater, more preferably about 0.5% by mass or greater, and still more preferably about 1% by mass or greater, as the solid quantity (solid content concentration). The content of the coloring material (B) in an aqueous inkjet ink according to a preferred embodiment of the present invention is, for example, preferably about 20% by mass or less, more preferably about 15% by mass or less, and still more preferably about 12% by mass or less, as the solid quantity (solid content concentration).

Water-Soluble Organic Solvent Component (C)

In this specification, the "water-soluble organic solvent" used as the water-soluble organic solvent component (C) refers to an organic solvent having a solubility of about 500 g/L or greater with respect to water at about 20° C. A preferable water-soluble organic solvent is uniformly miscible in water at any ratio at about 20° C.

The water-soluble organic solvent component (C) includes at least the monool-type solvent (1) represented by $R^1O(CH_2CH_2O)_mH$ (in the formula, $R^1$ represents a straight or branched alkyl group having 1 to 4 carbon atoms, and m represents an integer of 2 or 3); the monool-type solvent (2) represented by $R^2O(C_3H_6O)_nH$ (in the formula, $R^2$ represents a straight or branched alkyl group having 1 to 4 carbon atoms, and n represents an integer of 2 or 3); and the monool-type solvent (3) that is at least one selected from the group consisting of 3-methoxy-1-butanol and 3-methoxy-3-methyl-1-butanol.

The monool-type solvent (3) that is at least one selected from the group consisting of 3-methoxy-1-butanol and 3-methoxy-3-methyl-1-butanol is a component that improves an initial drying property of an aqueous inkjet ink according to a preferred embodiment of the present invention. The monool-type solvent (3) is preferably 3-methoxy-1-butanol, which more effectively and completely suppresses ink bleeding from the image. The content of the monool-type solvent (3) in an aqueous inkjet ink according to a preferred embodiment of the present invention is about 8% by mass or greater and about 27% by mass or less. In the case where the content is less than about 8% by mass, the rate of initial drying of the ink is too slow, which causes ink bleeding from the image, and decreases the optical concentration value due to non-uniformity of the image. The content is preferably about 10% by mass or greater, more preferably about 12.5% by mass or greater, and still more preferably about 15% by mass or greater. In the case where the content exceeds about 27% by mass, the storage stability of the ink is decreased, and the initial drying of the ink is too fast, which suppresses a plain image from being easily filled with the ink and thus decreases the optical concentration value. The content is preferably about 25% by mass or less, and more preferably about 23% by mass or less.

The monool-type solvent (1) represented by $R^1O(CH_2CH_2O)_mH$ (in the formula, $R^1$ represents a straight or branched alkyl group having 1 to 4 carbon atoms, and m represents an integer of 2 or 3) is a component that improves the fixation of an aqueous inkjet ink according to a preferred embodiment of the present invention. The monool-type solvent (1) is capable of dissolving, especially, a PVC substrate, and thus is especially effective to improve the fixation onto the PVC substrate. The monool-type solvent (1) may be a single monool-type solvent, or a combination of two or more monool-type solvents, satisfying the above-identified formula. In the above-identified formula, $R^1$ is preferably a straight or branched alkyl group having 3 or 4 carbon atoms, and is more preferably an n-butyl group. The monool-type solvent (1) is preferably diethyleneglycolmonobutylether or triethyleneglycolmonobutylether, both of which have a higher storage stability; and is more preferably triethyleneglycolmonobutylether. The content of the monool-type solvent (1) in an aqueous inkjet ink according to a preferred embodiment of the present invention is about 0.5% by mass or greater and about 9% by mass or less. In the case where the content is less than about 0.5% by mass, a sufficiently high level of fixation onto the PVC substrate is not achieved. The content is preferably about 1% by mass or greater, more preferably about 2% by mass or greater, and still more preferably about 3% by mass or greater. In the case where the content exceeds about 9% by mass, the storage stability of the ink is decreased. The content is preferably about 8.5% by mass or less, more preferably about 8% by mass or less, and still more preferably about 7.5% by mass or less.

The monool-type solvent (2) represented by $R^2O(C_3H_6O)_nH$ (in the formula, $R^2$ represents a straight or branched alkyl group having 1 to 4 carbon atoms, and n represents an integer of 2 or 3) is a component that improves the wet-spreadability of an aqueous inkjet ink according to a preferred embodiment of the present invention to suppress ink bleeding from the image and improve the optical concentration value. The monool-type solvent (2) may be a single monool-type solvent, or a combination of two or more monool-type solvents, satisfying the above-identified formula. In the above-identified formula, $R^2$ is preferably a methyl group or an ethyl group, and is more preferably a methyl group. The monool-type solvent (2) is preferably dipropyleneglycolmonomethylether or tripropyleneglycolmonomethylether. The propylene group ($C_3H_6$) may be either an n-propylene group or an isopropylene group, and is preferably an isopropylene group. The content of the monool-type solvent (2) in an aqueous inkjet ink according to a preferred embodiment of the present invention is about 0.5% by mass or greater and about 9% by mass or less. In the case where the content is less than about 0.5% by mass, ink bleeding from the image is easily caused, and a sufficiently high optical concentration value is not provided. The content is preferably about 1% by mass or greater, more preferably about 2% by mass or greater, and still more preferably about 3% by mass or greater. In the case where the content exceeds about 9% by mass, ink bleeding from the image is caused. The content is preferably about 8.5% by mass or less, more preferably about 8% by mass or less, and still more preferably about 7.5% by mass or less.

The water-soluble organic solvent component (C) may include another water-soluble organic solvent, namely, a water-soluble organic solvent other than the monool-type solvent (1), the monool-type solvent (2) and the monool-type solvent (3), in a range that does not significantly spoil the effects of the present invention. As the another water-soluble organic solvent, any solvent known as a water-soluble organic solvent for an aqueous inkjet ink is usable with no specific limitation. Examples of such a water-soluble organic solvent include diols such as ethylene glycol (boiling point: about 196° C.), diethylene glycol (boiling point: about 244° C.), triethylene glycol (boiling point: about 287° C.), propylene glycol (boiling point: about 188° C.), dipropylene glycol (boiling point: about 230° C.), 1,3-propanediol (boiling point: about 213° C.), 1,2-butanediol (boiling point: about 194° C.), 2,3-butanediol (boiling point: about 183° C.), 1,3-butanediol (boiling point: about 208° C.), 2,2-dimethyl-1,3-propanediol (boiling point: about 208° C.), 2-methyl-1,3-propanediol (boiling point: about 213° C.), 1,2-pentanediol (boiling point: about 206° C.), 2,4-pentanediol (boiling point: about 201° C.), 2-methyl-2,4-pentanediol (boiling point: about 198° C.), 1,5-pentanediol (boiling point: about 242° C.), 1,2-hexanediol (boiling point: about 224° C.), 1,6-hexanediol (boiling point: about 250° C.), 2-ethyl-1,3-hexanediol (boiling point: about 243° C.), and the like; monools such as propyleneglycol-n-butylether (boiling point: about 171° C.), propyleneglycol-t-butylether (boiling point: about 153° C.), ethyleneglycol-n-propylether (boiling point: about 150° C.), ethyleneglycol-n-butylether (boiling point: about 171° C.), 1-ethoxy-2-propanol (boiling point: about 132° C.), and the like; nitrogen-containing water-soluble organic solvents; and the like. These solvents may be used independently, or any two or more such solvents may be combined at any ratio for use.

The water-soluble organic solvent component (C) preferably includes a diol (namely, a diol-type water-soluble organic solvent), which further improves the storage stability of an aqueous inkjet ink according to a preferred embodiment of the present invention. A preferable diol satisfies HO—$R^3$—OH (in the formula, $R^3$ represents a straight or branched alkylene group having 3 to 6 carbon atoms). The content of the diol in an aqueous inkjet ink according to a preferred embodiment of the present invention is preferably about 1% by mass or greater, more preferably about 2% by mass or greater, and still more preferably about 3% by mass or greater. From the point of view of suppressing ink bleeding from the image and improving the fixation, the content of the diol in an aqueous inkjet ink according to a preferred embodiment of the present invention is preferably about 12% by mass or less, more preferably about 10% by mass or less, and still more preferably about 8% by mass or less.

A preferable combination of the water-soluble organic solvents includes triethyleneglycolmonobutylether as the monool-type solvent (1), at least one monool-type solvent selected from the group consisting of dipropyleneglycolmonomethylether and tripropyleneglycolmonomethylether as the monool-type solvent (2), and 3-methoxy-1-butanol as the monool-type solvent (3).

The content of the water-soluble organic solvent component (C) (i.e., total content of the water-soluble organic solvents) in an aqueous inkjet ink according to a preferred embodiment of the present invention is about 15% by mass or greater and about 42% by mass or less. In the case where the content of the water-soluble organic solvent component (C) is less than about 15% by mass, the effects realized by the incorporation of the above-described water-soluble organic solvents are not sufficiently achieved. The content is preferably about 20% by mass or greater, more preferably about 25% by mass or greater, and still more preferably about 27.5% by mass or greater. In the case where the content of the water-soluble organic solvent component (C) exceeds about 42% by mass, the storage stability of the ink is decreased. The content is preferably about 40% by mass or less, more preferably about 38% by mass or less, and still more preferably about 35% by mass or less.

Surfactant (D)

The surfactant (D) is a component that adjusts the surface tension and the interfacial tension to be adequate. As the surfactant (D), any known surfactant usable for an aqueous inkjet ink may be used with no specific limitation. Examples of such a surfactant include an anion surfactant, a nonion surfactant, a cation surfactant, an amphoteric surfactant, and the like. Among these surfactants, an anion surfactant and a nonion surfactant are preferable, and a nonion surfactant is more preferable.

Examples of the nonion surfactant include a sorbitol-based surfactant, an acetyleneglycol-based surfactant, a sorbitan-based surfactant, a silicone-based surfactant, a polyoxyethylenealkylether-based surfactant, a fluorine-based surfactant, and the like. Among these surfactants, a silicone-based surfactant, which adjusts the static surface tension with a small amount and thus significantly improves the wettability onto a PVC substrate, is preferable.

As the silicone-based surfactant, any known silicone-based surfactant may be used with no specific limitation. The silicone-based surfactant is also available commercially. Examples of such a commercially available silicone-based surfactant include BYK-306, BYK-307, BYK-333, BYK-345, BYK-346, BYK-347, BYK-348, and BYK-349 (produced by BYK Japan, K.K.); KF-351A, KF-352A, KF-353, KF-354L, KF-355A, KF-615A, KF-945, KF-640, KF-642, KF-643, KF-6020, X-22-4515, KF-6011, and KF-6012 (produced by Shin-Etsu Chemical Co., Ltd.); Silface SAG002, SAG005, SAG503A, and SAG008 (produced by Nisshin Chemical Industry Co., Ltd.); and the like. As the silicone-based surfactant, a polyether-modified silicone-based surfactant is preferable.

The content of the surfactant (D) in an aqueous inkjet ink according to a preferred embodiment of the present invention may be appropriately determined in accordance with the type of the surfactant to be used, such that the surface tension and the interfacial tension of the ink are adequate.

The content of the surfactant (D) is preferably about 0.05% by mass or greater, and more preferably about 0.2% by mass or greater. The content of the surfactant (D) is preferably about 5% by mass or less, more preferably about 3% by mass or less, and still more preferably about 2.5% by mass or less.

Resin Microparticles (E)

The resin microparticles (E) form a binder component that increases the fixation to the non-absorbent substrate and the tolerance of an ink film.

As the resin microparticles (E), any known resin microparticles usable for an aqueous inkjet ink may be used with no specific limitation. Examples of resins that form the resin microparticles (E) include a urethane resin, a polyester resin, an acrylic resin, a vinyl acetate resin, a polyethylene resin, a polypropylene resin, a fluoroolefin resin, a butadiene resin, a styrene resin, a styrene-butadiene resin, a styrene-acrylic resin, an ethylene-acrylic resin, a vinyl chloride resin, an acrylic-silicone resin, and the like.

The resin microparticles (E) do not need to be made of one type of resin, and may be made of two or more types of resins. For example, core-shell type microparticles including a core portion and a shell portion having different resin compositions from each other, microparticles obtained as a result of emulsion polymerization, with pre-produced acrylic microparticles (seed particles), of a different type of monomer in order to control the particle size, or the like may be used. Alternatively, hybrid resin microparticles obtained as a result of chemical bonding of resin microparticles made of different resins, for example, microparticles made of an acrylic resin and microparticles made of a urethane resin, may be used.

The resin microparticles (E) preferably include an acrylic resin or a urethane resin at least in a surface portion thereof, and more preferably include a urethane resin at least in a surface portion thereof, because these resins have a high level of fixation and a high ink stability.

There is no specific limitation on the volume-average particle size of the resin microparticles (E). The volume-average particle size is, for example, preferably about 10 nm to about 1000 nm, more preferably about 10 nm to about 200 nm, and still more preferably about 10 nm to about 50 nm. The volume-average particle size may be determined by use of, for example, a particle size distribution meter.

The content of the resin microparticles (E) in an aqueous inkjet ink according to a preferred embodiment of the present invention is preferably about 3% by mass or greater, and more preferably about 5% by mass or greater, as the solid quantity (solid content concentration). The content of the resin microparticles (E) in an aqueous inkjet ink according to a preferred embodiment of the present invention is preferably about 15% by mass or less, and more preferably about 12% by mass or less, as the solid quantity (solid content concentration).

An aqueous inkjet ink according to a preferred embodiment of the present invention may include, in addition to the above components, an additive such as a preservative, a fungicide, a thickener, an anti-foam agent, a pH adjuster, a rust-inhibitor or the like in a range in which the effects of preferred embodiments of the present invention are not significantly spoiled.

An aqueous inkjet ink according to a preferred embodiment of the present invention may be produced by mixing the components according to a known method. For example, an aqueous inkjet ink according to a preferred embodiment of the present invention may be produced by mixing water (A), an emulsion including a coloring material (B), a water-soluble organic solvent component (C), a surfactant (D), an emulsion including resin microparticles (E), and other components uniformly by use of a known mixing device or a known stirring device.

An aqueous inkjet ink according to a preferred embodiment of the present invention includes specific amounts of specific types of water-soluble organic solvents and thus has a superb storage stability. With a conventional aqueous inkjet ink, following occurs. Before the ink drop ejected from an inkjet head to a PVC substrate wet-spreads, an adjacent dot arrives at the PVC substrate and the ink drops are combined together. As a result, ink bleeding from the image is caused. In addition, since the ink does not wet-spread sufficiently in a step of drying the ink, a plain image of a low resolution is not easily filled with the ink, and thus the optical concentration value is decreased. The poor initial drying property of the ink causes ink bleeding from the image and decreases the optical concentration value. By contrast, an aqueous inkjet ink according to a preferred embodiment of the present invention includes specific amounts of specific types of water-soluble organic solvents, and therefore, has an improved wet-spreadability on the PVC substrate and an improved initial drying property. Therefore, when printed on a PVC substrate, an aqueous inkjet ink according to a preferred embodiment of the present invention forms an image with little or no ink bleeding and a high optical concentration value. In the case where the image is of a low resolution, the effect of improving the optical concentration value is especially high. An aqueous inkjet ink according to a preferred embodiment of the present invention includes a water-soluble organic solvent that dissolves a PVC substrate, and therefore, when used to print on, especially, a PVC substrate, forms an image having a high level of fixation.

As described above, an aqueous inkjet ink according to a preferred embodiment of the present invention is preferably usable to print on a PVC substrate. An aqueous inkjet ink according to a preferred embodiment of the present invention is also usable to print (image formation) on a substrate other than a PVC substrate, for example, non-absorbent substrates such as a PET substrate, a surface-treated (corona-treated) polyethylene (PE) substrate, a surface-treated (corona-treated) polypropylene (PP) substrate, a polystyrene substrate and the like; and paper substrates such as art paper, coated paper, cast paper, wood-free paper, synthetic paper, paper for inkjet, and the like. An aqueous inkjet ink according to a preferred embodiment of the present invention is preferably usable to print on a non-absorbent substrate.

In another aspect, a preferred embodiment of the present invention relates to an inkjet recording method including a step of ejecting the above-described aqueous inkjet ink (the aqueous inkjet ink according to preferred embodiments of the present invention described above) toward a medium including a non-absorbent substrate (hereinafter, also referred to as an "ejection step") and a step of drying the aqueous inkjet ink ejected on the medium to form an ink film (hereinafter, also referred to as a "film formation step").

Usable as the non-absorbent substrate are a PVC substrate, a PET substrate, a surface-treated (corona-treated) PE substrate, a surface-treated (corona-treated) PP substrate, a polystyrene substrate and the like. Among these substrates, a PVC substrate is preferable.

The medium may include a single layer structure of a non-absorbent substrate or may include a multiple layer structure. In the case of a multiple layer structure, the medium may include, for example, a non-absorbent substrate on which printing is to be performed and a pressure-sensitive adhesive layer.

In the ejection step, the inkjet ink is ejected toward the non-absorbent substrate of the medium. The inkjet recording method according to a preferred embodiment of the present invention may further include a step of heating the medium before the ejection step. When the medium is heated, the surface temperature of the medium is, for example, about 30° C. or higher but lower than the softening point of the medium (preferably, about 30° C. to about 80° C.).

In the film formation step, the medium may be heated in order to promote drying. When the medium is heated, the surface temperature of the medium is, for example, about 30° C. or higher but lower than the softening point of the medium (preferably, about 30° C. to about 80° C.).

An inkjet recording method according to a preferred embodiment of the present invention may include a step of cutting the medium (hereinafter, referred to also as a "cutting step") after the film formation step.

An inkjet recording method according to a preferred embodiment of the present invention forms an image with little or no ink bleeding, a high optical concentration value, and a high level of fixation.

An inkjet recording method according to a preferred embodiment of the present invention is performed preferably using an inkjet recording device including a conveyer that transports a medium including a non-absorbent substrate, a heater that heats the transported medium, an ejector that ejects the inkjet ink toward the heated medium, and an ink container that contains the inkjet ink and supplies the inkjet ink to the ejector. The inkjet ink is the above-described aqueous inkjet ink (the aqueous inkjet ink according to preferred embodiments of the present invention described above).

As an example, an inkjet recording device according to a preferred embodiment of the present invention will be described with reference to the FIGURE. The FIGURE is a conceptual view of an inkjet recording device 100 according to this preferred embodiment of the present invention. The inkjet recording device 100 according to this preferred embodiment includes a conveyer 20 that transports a medium 10 including a non-absorbent substrate. The conveyer 20 preferably includes a supply roller 21, a take-up roller 22, and a transportation roller 23. The medium 10 is fed from the supply roller 21, passes over a platen 30 while being transported by the transportation roller 23, and is taken up by the take-up roller 22. Therefore, in this preferred embodiment, a direction of transporting the medium 10 is from the supply roller 21 toward the take-up roller 22. The medium 10 is shown for the sake of convenience, and is not an element of the inkjet recording device 100. As the medium 10, a medium including a non-absorbent substrate (especially, a PVC substrate) is preferable.

The inkjet recording device 100 includes a heater 40. In this preferred embodiment, the heater 40 preferably functions as a preheater to heat the medium 10. The heater 40 includes, for example, a contact-heat sheet heater, a radiation heater that radiates infrared waves or microwaves, or a warm air heater. The heater 40 may be located above or below the medium 10, or may be located above and below the medium 10. Heating conditions for the heater 40 are set such that the temperature of the medium 10 is, for example, about 30° C. or higher but lower than the softening point thereof (such that the temperature of the medium 10 is preferably about 30° C. to about 80° C.). The heater 40 is not limited to including the above-described structure and may include any structure as long as the medium 10 is heated to a predetermined temperature before an inkjet ink 11 is ejected toward the medium 10. For example, the heater 40 may be provided below an ejector 50. In this case, the heater 40 may be provided as a print heater built into the platen 30.

The inkjet recording device 100 includes the ejector 50 that ejects the inkjet ink 11 toward the medium 10. In this preferred embodiment, the ejector 50 is located downstream with respect to the heater 40 in the transportation direction of the medium 10. The ejector 50 includes an inkjet head that ejects the inkjet ink 11 in the form of liquid drops from a microscopic nozzle that uses, for example, vibration of a piezoelectric element. The inkjet recording device 100 includes an ink container 60. The ink container 60 is connected with the ejector 50. The ink container 60 includes, for example, an ink cartridge. Before being ejected, the inkjet ink 11 is contained in the ink container 60. The inkjet ink 11 contained in the ink container 60 is supplied to the ejector 50 when necessary. The inkjet ink 11 is one of the above-described aqueous inkjet inks according to one of the preferred embodiments of the present invention described above.

The inkjet recording device 100 preferably includes a dryer 70 that dries the ejected inkjet ink 11. In this preferred embodiment, the dryer 70 is located downstream with respect to the ejector 50 in the transportation direction of the medium 10, and is preferably provided in a carriage 71. The dryer 70 includes, for example, a heater such as a radiation heater that radiates infrared waves or microwaves, a warm air heater or the like, or an air blowing dryer. Drying conditions for the dryer 70 are set such that the inkjet ink 11 attached to the medium 10 is dried to form an image. Drying conditions are appropriately selected in accordance with the type and the amount of each of the solvents included in the inkjet ink 11. The dryer 70 is preferably a heater, and heating conditions for the heater are set such that the temperature of the medium 10 is, for example, about 30° C. or higher but lower than a softening point of the medium 10 (such that the temperature of the medium 10 is preferably about 30° C. to about 80° C.). The dryer 70 is not limited to that described above. For example, the dryer 70 may be provided below the medium 10. Specifically, for example, the dryer 70 may be provided below the medium 10 as a post heater built into the platen 30.

An inkjet recording device according to a preferred embodiment of the present invention forms an image with little or no ink bleeding, a high optical concentration value, and a high level of fixation.

Hereinafter, various preferred embodiments of the present invention will be described in detail by way of examples. The present invention is not limited to any of the following examples.

Preparation of Inkjet Ink

The components shown in Table 1 through Table 7 were mixed uniformly at a mass ratio shown in the tables to obtain examples and comparative examples of inkjet inks. For the obtained inkjet inks, the storage stability was evaluated by the following method. The obtained inkjet inks were printed on a PVC film using an inkjet printer, and were evaluated regarding the ink bleeding from the image, the optical concentration value (OD value), and the rubfastness as the level of fixation by the methods described below. The printing was performed as follows. In examples 1 through 23 and comparative examples 1 through 11, the surface temperature of the PVC film was increased to 30° C. to 45° C. before the printing, and was increased to 60° C. after the printing. In examples 24 and 25 and comparative examples 12 and 13, the surface temperature of the PVC film was increased to 30° C. to 45° C. before the printing, and was increased to 40° C. to 50° C. after the printing. For the evaluation of the ink bleeding from the image, a fully plain image with a 5 pt L-dot white letter on a colored background was made under the conditions that the amount of the ink was 22 pl per drop and that the resolution was 600 dpi×600 dpi. For the evaluation of the OD value and the rubfastness, a fully plain image was formed under the conditions that the amount of the ink was 22 pl per drop and that the resolution was 600 dpi×600 dpi. The evaluation results are shown in Table 1 through Table 7.

Storage Stability

The inkjet ink was placed in an environment at 45° C. and stored for 3 months. The viscosity of the ink was measured before and after the storage by use of a viscometer to determine a viscosity change ratio, and the storage stability was evaluated by the following criteria. "◯" and "Δ" indicate that the test was passed.

◯: The viscosity change ratio was within ±10%.

Δ: The viscosity change ratio exceeded ±10% but was within ±15%.

x: The viscosity change ratio exceeded ±15%.

Evaluation on the Ink Bleeding

The degree of ink bleeding from the image with a L-dot white letter on a colored background was visually observed. Based on the observation results, the degree of ink bleeding was evaluated with the following criteria. "◯" and "Δ" indicate that the test was passed.

◯: The white letter was highly visually identifiable.

Δ: Ink was slightly bleeding into the white letter, but the white letter was visually identifiable.

x: Ink was bleeding and the white letter was not visually identifiable.

Evaluation on the OD Value

The OD value of the fully plain image was measured three times and the average value thereof was obtained. The OD value was evaluated with the following criteria. "◯" and "Δ" indicate that the test was passed.

Examples 1 through 20 and comparative examples 1 through 9).

◯: 2.0 or higher

Δ: 1.8 or higher and lower than 2.0 x: Lower than 1.8

Examples 24 and 25 and comparative examples 12 and 13.

◯: 1.4 or higher

Δ: 1.2 or higher and lower than 1.4 x: Lower than 1.2

Evaluation on the Rubfastness

A piece of dry cloth was attached to a JSPS (Japan Society for the Promotion of Science) tester. The cloth, with a weight of 500 g attached thereto, was moved reciprocally 100 times on an ink film of the plain image. Then, the state of the ink film was observed. Based on the observation results, the rubfastness was evaluated with the following criteria. "◯" and "Δ" indicate that the test was passed. In examples 1 through 20 and comparative examples 1 through 9, the evaluation was made immediately after the plain image was formed.

◯: No ink film was removed.

Δ: Only a portion of the ink film was removed.

x: Half or more of the ink film was removed.

TABLE 1

| | | EX. 1 | EX. 2 | EX. 3 | EX. 4 | EX. 5 | EX. 6 |
|---|---|---|---|---|---|---|---|
| COLORING MATERIAL | CAB-O-JET 300 (SOLID CONTENT: 15%) | 16 | 16 | 16 | 16 | 16 | 16 |
| | CAB-O-JET 260M (SOLID CONTENT: 10%) | | | | | | |
| WATER-SOLUBLE ORGANIC SOLVENT | (1) TRIETHYLENEGLYCOLMONOBUTYLETHER | 5 | 5 | 5 | 10 | 2 | 5 |
| | (2) DIPROPYLENEGLYCOLMONOMETHYLETHER | 5 | 5 | 5 | 5 | 5 | 2 |
| | TRIPROPYLENEGLYCOLMONOMETHYLETHER | | | | | | |
| | PROPYLENEGLYCOL | 5 | 5 | 5 | 5 | 5 | 5 |
| | 1,3-PROPANEDIOL | | | | | | |
| | 2-METHYL-1,3-PROPANEDIOL | | | | | | |
| | (3) 3-METHOXY-1-BUTANOL | 15 | 10 | 25 | 15 | 15 | 15 |
| SURFACTANT | SAG 503A | 0.4 | 0.4 | 0.4 | 0.4 | 0.4 | 0.4 |
| | SAG 002 | | | | | | |
| RESIN MICROPARTICLES | VINYBLAN 715S (SOLID CONTENT: 25%) | 32 | 32 | 32 | 32 | 32 | 32 |
| | PE1126 (SOLID CONTENT: 41%) | | | | | | |
| WATER | PURIFIED WATER (SEPARATELY INCORPORATED) | 21.6 | 26.6 | 11.6 | 16.6 | 24.6 | 24.6 |
| | TOTAL | 100 | 100 | 100 | 100 | 100 | 100 |
| | TOTAL AMOUNT OF WATER-SOLUBLE ORGANIC SOLVENTS | 30 | 25 | 40 | 35 | 27 | 27 |
| | STORAGE STABILITY | ◯ | ◯ | Δ | Δ | ◯ | ◯ |
| | INK BLEEDING FROM THE IMAGE | ◯ | Δ | ◯ | ◯ | ◯ | ◯ |
| | OD VALUE | ◯ | Δ | ◯ | ◯ | ◯ | Δ |
| | RUBFASTNESS | ◯ | ◯ | ◯ | ◯ | Δ | ◯ |

TABLE 2

| | | EX. 7 | EX. 8 | EX. 9 | EX. 10 | EX. 11 | EX. 12 |
|---|---|---|---|---|---|---|---|
| COLORING MATERIAL | CAB-O-JET 300 (SOLID CONTENT: 15%) | 16 | 16 | 16 | 16 | 16 | 16 |
| | CAB-O-JET 260M (SOLID CONTENT: 10%) | | | | | | |
| WATER-SOLUBLE ORGANIC SOLVENT | (1) TRIETHYLENEGLYCOLMONOBUTYLETHER | 5 | 5 | 5 | 5 | 5 | 5 |
| | (2) DIPROPYLENEGLYCOLMONOMETHYLETHER | | 5 | 5 | 5 | 5 | 5 |
| | TRIPROPYLENEGLYCOLMONOMETHYLETHER | 5 | | | | | |
| | PROPYLENEGLYCOL | 5 | | | | | |
| | 1,3-PROPANEDIOL | | 5 | | | | |
| | 2-METHYL-1,3-PROPANEDIOL | | | 5 | | 5 | 5 |
| | (3) 3-METHOXY-1-BUTANOL | 15 | 15 | 15 | 15 | 15 | 15 |

TABLE 2-continued

| | | EX. 7 | EX. 8 | EX. 9 | EX. 10 | EX. 11 | EX. 12 |
|---|---|---|---|---|---|---|---|
| SURFACTANT | SAG 503A | 0.4 | 0.4 | 0.4 | 0.4 | 0.4 | |
| | SAG 002 | | | | | | 0.4 |
| RESIN MICROPARTICLES | VINYBLAN 715S (SOLID CONTENT: 25%) | 32 | 32 | 32 | 32 | | 32 |
| | PE1126 (SOLID CONTENT: 41%) | | | | | 19.5 | |
| WATER | PURIFIED WATER (SEPARATELY INCORPORATED) | 21.6 | 21.6 | 21.6 | 26.6 | 34.1 | 21.6 |
| | TOTAL | 100 | 100 | 100 | 100 | 100 | 100 |
| TOTAL AMOUNT OF WATER-SOLUBLE ORGANIC SOLVENTS | | 30 | 30 | 30 | 25 | 30 | 30 |
| STORAGE STABILITY | | ○ | ○ | ○ | Δ | ○ | ○ |
| INK BLEEDING FROM THE IMAGE | | ○ | ○ | ○ | ○ | ○ | ○ |
| OD VALUE | | ○ | ○ | ○ | ○ | ○ | ○ |
| RUBFASTNESS | | ○ | ○ | ○ | ○ | Δ | ○ |

TABLE 3

| | | COMPARATIVE EX. 1 | COMPARATIVE EX. 2 | COMPARATIVE EX. 3 | COMPARATIVE EX. 4 | COMPARATIVE EX. 5 |
|---|---|---|---|---|---|---|
| COLORING MATERIAL | CAB-O-JET 300 (SOLID CONTENT: 15%) | 16 | 16 | 16 | 16 | 16 |
| | CAB-O-JET 260M (SOLID CONTENT: 10%) | | | | | |
| WATER-SOLUBLE ORGANIC SOLVENT (1) | TRIETHYLENEGLYCOLMONOBUTYLETHER | 5 | 5 | 0 | 12 | 5 |
| (2) | DIPROPYLENEGLYCOLMONOMETHYLETHER | 5 | 5 | 5 | 5 | 0 |
| | TRIPROPYLENEGLYCOLMONOMETHYLETHER | | | | | |
| | PROPYLENEGLYCOL | 5 | 5 | 5 | 5 | 5 |
| | 1,3-PROPANEDIOL | | | | | |
| | 2-METHYL-1,3-PROPANEDIOL | | | | | |
| (3) | 3-METHOXY-1-BUTANOL | 5 | 30 | 15 | 15 | 15 |
| SURFACTANT | SAG 503A | 0.4 | 0.4 | 0.4 | 0.4 | 0.4 |
| | SAG 002 | | | | | |
| RESIN MICROPARTICLES | VINYBLAN 715S (SOLID CONTENT: 25%) | 32 | 32 | 32 | 32 | 32 |
| | PE1126 (SOLID CONTENT: 41%) | | | | | |
| WATER | PURIFIED WATER (SEPARATELY INCORPORATED) | 31.6 | 6.6 | 26.6 | 14.6 | 26.6 |
| | TOTAL | 100 | 100 | 100 | 100 | 100 |
| TOTAL AMOUNT OF WATER-SOLUBLE ORGANIC SOLVENTS | | 20 | 45 | 25 | 37 | 25 |
| STORAGE STABILITY | | ○ | X | ○ | X | ○ |
| INK BLEEDING FROM THE IMAGE | | X | ○ | Δ | ○ | Δ |
| OD VALUE | | X | Δ | ○ | ○ | X |
| RUBFASTNESS | | ○ | ○ | X | ○ | ○ |

TABLE 4

| | | EX. 13 | EX. 14 | EX. 15 | EX. 16 | EX. 17 | EX. 18 |
|---|---|---|---|---|---|---|---|
| COLORING MATERIAL | CAB-O-JET 300 (SOLID CONTENT: 15%) | 16 | 16 | 16 | 16 | 16 | 16 |
| | CAB-O-JET 260M (SOLID CONTENT: 10%) | | | | | | |
| WATER-SOLUBLE ORGANIC SOLVENT (1) | DIETHYLENEGLYCOLMONOBUTYLETHER | | | | | | 5 |
| | TRIETHYLENEGLYCOLMONOBUTYLETHER | 5 | 5 | 5 | 5 | 5 | |
| (2) | DIPROPYLENEGLYCOLMONOMETHYLETHER | | | | | | |
| | TRIPROPYLENEGLYCOLMONOMETHYLETHER | 5 | 5 | 5 | 5 | 5 | 5 |
| | 2-METHYL-1,3-PROPANEDIOL | 5 | 5 | 5 | 5 | | 5 |
| | 1,5-PENTANEDIOL | | | | | 5 | |
| (3) | 3-METHOXY-1-BUTANOL | 15 | 10 | 25 | | 15 | 15 |
| | 3-METHOXY-3-METHYL-1-BUTANOL | | | | 15 | | |
| SURFACTANT | SAG 503A | 0.4 | 0.4 | 0.4 | 0.4 | 0.4 | 0.4 |
| | SAG 002 | | | | | | |
| RESIN MICROPARTICLES | VINYBLAN 715S (SOLID CONTENT: 25%) | 32 | 32 | 32 | 32 | 32 | 32 |
| | PE1126 (SOLID CONTENT: 41%) | | | | | | |
| WATER | PURIFIED WATER (SEPARATELY INCORPORATED) | 21.6 | 26.6 | 11.6 | 21.6 | 21.6 | 21.6 |
| | TOTAL | 100 | 100 | 100 | 100 | 100 | 100 |
| TOTAL AMOUNT OF WATER-SOLUBLE ORGANIC SOLVENTS | | 30 | 25 | 40 | 30 | 30 | 30 |
| STORAGE STABILITY | | ○ | ○ | Δ | ○ | ○ | Δ |
| INK BLEEDING FROM THE IMAGE | | ○ | Δ | ○ | Δ | ○ | ○ |
| OD VALUE | | ○ | Δ | ○ | ○ | ○ | ○ |
| RUBFASTNESS | | ○ | ○ | ○ | ○ | Δ | ○ |

TABLE 5

|  |  | EX. 19 | EX. 20 | EX. 21 | EX. 22 | EX. 23 |
|---|---|---|---|---|---|---|
| COLORING MATERIAL | CAB-O-JET 300 (SOLID CONTENT: 15%) | 16 | 16 | 16 | 16 | 16 |
|  | CAB-O-JET 260M (SOLID CONTENT: 10%) |  |  |  |  |  |
| WATER-SOLUBLE ORGANIC SOLVENT | (1) DIETHYLENEGLYCOLMONOBUTYLETHER |  |  |  |  |  |
|  | TRIETHYLENEGLYCOLMONOBUTYLETHER | 5 | 5 | 5 | 7 | 5 |
|  | (2) DIPROPYLENEGLYCOLMONOMETHYLETHER |  |  |  |  |  |
|  | TRIPROPYLENEGLYCOLMONOMETHYLETHER | 5 | 5 | 7 | 5 | 5 |
|  | 2-METHYL-1,3-PROPANEDIOL | 5 | 5 | 5 | 5 | 10 |
|  | 1,5-PENTANEDIOL |  |  |  |  |  |
|  | (3) 3-METHOXY-1-BUTANOL | 15 | 15 | 15 | 15 | 15 |
|  | 3-METHOXY-3-METHYL-1-BUTANOL |  |  |  |  |  |
| SURFACTANT | SAG 503A | 0.4 |  | 0.4 | 0.4 | 0.4 |
|  | SAG 002 |  | 0.4 |  |  |  |
| RESIN MICROPARTICLES | VINYBLAN 715S (SOLID CONTENT: 25%) |  | 32 | 32 | 32 | 32 |
|  | PE1126 (SOLID CONTENT: 41%) | 19.4 |  |  |  |  |
| WATER | PURIFIED WATER (SEPARATELY INCORPORATED) | 34.2 | 21.6 | 19.6 | 19.6 | 16.6 |
|  | TOTAL | 100 | 100 | 100 | 100 | 100 |
|  | TOTAL AMOUNT OF WATER-SOLUBLE ORGANIC SOLVENTS | 30 | 30 | 32 | 32 | 35 |
|  | STORAGE STABILITY | ○ | ○ | ○ | Δ | ○ |
|  | INK BLEEDING FROM THE IMAGE | ○ | ○ | Δ | ○ | Δ |
|  | OD VALUE | ○ | ○ | ○ | ○ | ○ |
|  | RUBFASTNESS | Δ | ○ | ○ | ○ | Δ |

TABLE 6

|  |  | COMPARATIVE EX. 6 | COMPARATIVE EX. 7 | COMPARATIVE EX. 8 | COMPARATIVE EX. 9 | COMPARATIVE EX. 10 | COMPARATIVE EX. 11 |
|---|---|---|---|---|---|---|---|
| COLORING MATERIAL | CAB-O-JET 300 (SOLID CONTENT: 15%) | 16 | 16 | 16 | 16 | 16 | 16 |
|  | CAB-O-JET 260M (SOLID CONTENT: 10%) |  |  |  |  |  |  |
| WATER-SOLUBLE ORGANIC SOLVENT | (1) DIETHYLENEGLYCOLMONOBUTYLETHER |  |  |  |  |  |  |
|  | TRIETHYLENEGLYCOLMONOBUTYLETHER | 5 | 5 | 0 | 5 | 5 | 10 |
|  | (2) DIPROPYLENEGLYCOLMONOMETHYLETHER |  |  |  |  |  |  |
|  | TRIPROPYLENEGLYCOLMONOMETHYLETHER | 5 | 5 | 5 | 0 | 10 | 5 |
|  | 2-METHYL-1,3-PROPANEDIOL | 5 | 5 | 5 | 5 | 5 | 5 |
|  | 1,5-PENTANEDIOL |  |  |  |  |  |  |
|  | (3) 3-METHOXY-1-BUTANOL | 5 | 30 | 15 | 15 | 15 | 15 |
|  | 3-METHOXY-3-METHYL-1-BUTANOL |  |  |  |  |  |  |
| SURFACTANT | SAG 503A | 0.4 | 0.4 | 0.4 | 0.4 | 0.4 | 0.4 |
|  | SAG 002 |  |  |  |  |  |  |
| RESIN MICROPARTICLES | VINYBLAN 715S (SOLID CONTENT: 25%) | 32 | 32 | 32 | 32 | 32 | 32 |
|  | PE1126 (SOLID CONTENT: 41%) |  |  |  |  |  |  |
| WATER | PURIFIED WATER (SEPARATELY INCORPORATED) | 31.6 | 6.6 | 26.6 | 26.6 | 16.6 | 16.6 |
|  | TOTAL | 100 | 100 | 100 | 100 | 100 | 100 |
|  | TOTAL AMOUNT OF WATER-SOLUBLE ORGANIC SOLVENTS | 20 | 45 | 25 | 25 | 35 | 35 |
|  | STORAGE STABILITY | ○ | X | ○ | Δ | ○ | X |
|  | INK BLEEDING FROM THE IMAGE | X | ○ | Δ | Δ | X | ○ |
|  | OD VALUE | X | Δ | ○ | X | ○ | ○ |
|  | RUBFASTNESS | ○ | ○ | X | ○ | ○ | ○ |

TABLE 7

|  |  | EX. 24 | EX. 25 | COMPARATIVE EX. 12 | COMPARATIVE EX. 13 |
|---|---|---|---|---|---|
| COLORING MATERIAL | CAB-O-JET 300 (SOLID CONTENT: 15%) |  |  |  |  |
|  | CAB-O-JET 260M (SOLID CONTENT: 10%) | 24 | 24 | 24 | 24 |
| WATER-SOLUBLE ORGANIC SOLVENT | (1) DIETHYLENEGLYCOLMONOBUTYLETHER |  | 5 |  | 5 |
|  | TRIETHYLENEGLYCOLMONOBUTYLETHER | 5 |  | 5 |  |
|  | (2) DIPROPYLENEGLYCOLMONOMETHYLETHER | 5 | 5 | 5 | 5 |
|  | TRIPROPYLENEGLYCOLMONOMETHYLETHER |  |  |  |  |
|  | PROPYLENEGLYCOL | 5 |  | 5 |  |
|  | 1,5-PENTANEDIOL |  | 5 |  | 5 |
|  | (3) 3-METHOXY-1-BUTANOL | 15 |  | 5 |  |
|  | 3-METHOXY-3-METHYL-1-BUTANOL |  | 15 |  | 5 |
| SURFACTANT | SAG 503A | 0.4 | 0.4 | 0.4 | 0.4 |
|  | SAG 002 |  |  |  |  |

TABLE 7-continued

|  |  | EX. 24 | EX. 25 | COMPARATIVE EX. 12 | COMPARATIVE EX. 13 |
|---|---|---|---|---|---|
| RESIN MICROPARTICLES | VINYBLAN 715S (SOLID CONTENT: 25%) PE1126 (SOLID CONTENT: 41%) | 32 | 32 | 32 | 32 |
| WATER | PURIFIED WATER (SEPARATELY INCORPORATED) | 13.6 | 13.6 | 23.6 | 23.6 |
|  | TOTAL | 100 | 100 | 100 | 100 |
|  | TOTAL AMOUNT OF WATER-SOLUBLE ORGANIC SOLVENTS | 30 | 30 | 20 | 20 |
|  | STORAGE STABILITY | ○ | ○ | ○ | ○ |
|  | INK BLEEDING FROM THE IMAGE | ○ | ○ | X | X |
|  | OD VALUE | ○ | ○ | X | X |
|  | RUBFASTNESS | ○ | ○ | ○ | ○ |

The numerical value for each component in the tables represents the mass ratio.

CAB-O-JET300 (produced by Cabot Corporation): self-dispersible black-type pigment (aqueous emulsion having a solid content of 15% by mass)

CAB-O-JET260M (produced by Cabot Corporation): self-dispersible magenta-type pigment (aqueous emulsion having a solid content of 10% by mass)

SAG503A (produced by Nisshin Chemical Industry Co., Ltd.): silicone-based surfactant "Silface SAG503A"

SAG002 (produced by Nisshin Chemical Industry Co., Ltd.): silicone-based surfactant "Silface SAG002"

Vinyblan 715S (produced by Nisshin Chemical Industry Co., Ltd.): aqueous emulsion of poly(vinyl chloride)-polyurethane core-shell particles (solid content: 25% by mass)

PE1126 (produced by Seiko PMC Corporation): acrylic resin aqueous emulsion (solid content: 41.5% by mass)

As shown in Tables 1 through 7, the aqueous inkjet inks in each of examples 1 through 25 within the scope of the present invention has a superb storage stability. Use of the aqueous inkjet inks in each of examples 1 through 25 within the scope of the present invention achieves an image with little or no ink bleeding, a high optical concentration value, and a high level of fixation to be formed on a PVC substrate. As a result of comparison of example 10 and the other examples in Table 2 with each other, it is seen that the storage stability is further improved in the case where a diol-type water-soluble organic solvent is incorporated into the aqueous inkjet ink. As a result of comparison of example 13 and example 16 in Table 4 with each other, it is seen that the ink bleeding from the image is highly reduced or prevented in the case where 3-methoxy-1-butanol is used as the monool-type solvent (3). As a result of comparison of example 13 and example 18 in Table 4 with each other, it is seen that the storage stability is especially high in the case where triethyleneglycolmonobutylether is used as the monool-type solvent (1).

As seen from the results in comparative example 1 in Table 3 and comparative example 6 in Table 6, the ink bleeding from the image is significant and the OD value is low in the case where the content of the monool-type solvent (3) in the aqueous inkjet ink is too low. A conceivable reason for this is that initial drying is not sufficiently performed. As seen from the results in comparative example 2 in Table 3 and comparative example 7 in Table 6, the storage stability is low and the OD value is slightly low in the case where the content of the monool-type solvent (3) in the aqueous inkjet ink is too high. A conceivable reason for this is that the initial drying of the ink is performed too quickly and thus the plain image is not sufficiently filled with ink. As seen from the results in comparative example 3 in Table 3 and comparative example 8 in Table 6, the rubfastness is low in the case where the aqueous inkjet ink does not include the monool-type solvent (1). From this, it is seen that the aqueous inkjet ink includes the monool-type solvent (1), which is a solvent that dissolves a PVC substrate, and therefore, provides a high level of fixation onto the PVC substrate. As seen from the results in comparative example 4 in Table 3 and comparative example 11 in Table 6, the storage stability is low in the case where the content of the monool-type solvent (1) in the aqueous inkjet ink is too high. As seen from the results in comparative example 5 in Table 3 and comparative example 9 in Table 6, slight ink bleeding from the image is caused and the OD value is low in the case where the aqueous inkjet ink does not include the monool-type solvent (2). A conceivable reason for this is that the wet-spreading of the ink during the step of drying the ink is poor. As seen from the results in comparative example 9 in Table 6, ink bleeding from the image is caused in the case where the content of the monool-type solvent (2) in the aqueous inkjet ink is too high. A conceivable reason for this is that the level of wet-spreading is too high in the step of drying the ink. In examples 24 and 25 and comparative examples 12 and 13 using a different coloring material, substantially the same results as those in example 1 and comparative example 1 were provided respectively.

The present invention may be embodied in other forms without departing from the spirit or characteristics thereof. The preferred embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

Aqueous inkjet inks according to the preferred embodiments of the present invention preferably are useful to print on a PVC substrate, and are also useful to print (image formation) on a substrate other than a PVC substrate, for example, non-absorbent substrates such as a PET substrate, a surface-treated (corona-treated) polyethylene (PE) substrate, a surface-treated (corona-treated) polypropylene (PP substrate), a polystyrene substrate and the like; and paper substrates such as art paper, coated paper, cast paper, wood-free paper, synthetic paper, paper for inkjet, and the like. An aqueous inkjet ink according to a preferred embodiment of the present invention is preferably useful to print on a non-absorbent substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An aqueous inkjet ink comprising:
water;
a coloring material;
a water-soluble organic solvent component;
a surfactant; and
resin microparticles; wherein
the water-soluble organic solvent component includes a first monool solvent represented by $R^1O(CH_2CH_2O)_mH$ in which $R^1$ represents a straight or branched alkyl group having 1 to 4 carbon atoms, and m represents an integer of 2 or 3; a second monool solvent represented by $R^2O(C_3H_6O)_nH$ in which $R^2$ represents a straight or branched alkyl group having 1 to 4 carbon atoms, and n represents an integer of 2 or 3; and a third monool solvent selected from the group consisting of 3-methoxy-1-butanol and 3-methoxy-3-methyl-1-butanol;
the content of the third monool solvent in the ink is about 8% by mass or greater and about 27% by mass or less;
the content of the first monool solvent in the ink is about 0.5% by mass or greater and about 9% by mass or less;
the content of the second monool solvent in the ink is about 0.5% by mass or greater and about 9% by mass or less; and
the content of the water-soluble organic solvent component in the ink is about 15% by mass or greater and about 42% by mass or less.

2. The aqueous inkjet ink according to claim 1, wherein the water-soluble organic solvent component further includes a diol water-soluble organic solvent.

3. The aqueous inkjet ink according to claim 2, wherein the diol water-soluble organic solvent includes a diol compound represented by HO—$R^3$—OH in which $R^3$ represents a straight or branched alkylene group having a carbon number of 3 to 6.

4. The aqueous inkjet ink according to claim 1, wherein the first monool solvent is selected from the group consisting of diethyleneglycolmonobutylether and triethyleneglycolmonobutylether.

5. The aqueous inkjet ink according to claim 1, wherein the second monool solvent is selected from the group consisting of dipropyleneglycolmonomethylether and tripropyleneglycolmonomethylether.

6. The aqueous inkjet ink according to claim 1, wherein the third monool solvent includes 3 methoxy-1-butanol.

7. The aqueous inkjet ink according to claim 1, wherein the first monool solvent includes triethyleneglycolmonobutylether, the second monool solvent is selected from the group consisting of dipropyleneglycolmonomethylether and tripropyleneglycolmonomethylether, and the third monool solvent includes 3-methoxy-1-butanol.

8. The aqueous inkjet ink according to claim 1, wherein the resin microparticles include an acrylic resin or a urethane resin at least in a surface portion thereof.

9. The aqueous inkjet ink according to claim 1, wherein the surfactant is a silicone-based surfactant.

10. An inkjet recording method comprising the steps of:
ejecting the aqueous inkjet ink according to claim 1 toward a medium including a non-absorbent substrate; and
drying the aqueous inkjet ink ejected on the medium to form an ink film.

11. The inkjet recording method according to claim 10, wherein the non-absorbent substrate includes poly(vinyl chloride).

12. An inkjet recording device comprising:
a conveyer that transports a medium including a non-absorbent substrate;
a heater that heats the medium;
an ejector that ejects an inkjet ink toward the heated medium; and
an ink container that contains the inkjet ink and supplies the inkjet ink to the ejector; wherein
the inkjet ink is the aqueous inkjet ink according to claim 1.

* * * * *